United States Patent [19]

Matsuda et al.

[11] Patent Number: 5,343,475
[45] Date of Patent: Aug. 30, 1994

[54] MULTIPLEX TRANSMISSION SYSTEM

[75] Inventors: Yutaka Matsuda; Hiroo Moriue, both of Hiratsuka; Yoshikazu Nobutoki, Higashihiroshima; Seiji Hirano, Hiroshima; Hiroaki Sakamoto, Fukuyama, all of Japan

[73] Assignees: The Furukawa Electric Co., Ltd., Tokyo; Mazda Motor Corp., Hiroshima, both of Japan

[21] Appl. No.: 860,896

[22] Filed: Mar. 31, 1992

[30] Foreign Application Priority Data

Apr. 2, 1991 [JP] Japan .................. 3-070031

[51] Int. Cl.$^5$ .................. H04J 3/24; H04J 3/02; H04L 1/18
[52] U.S. Cl. .................. 370/94.1; 370/85.1; 371/33
[58] Field of Search .................. 370/85.1, 85.13, 94.1, 370/94.3, 110.1, 9; 307/10.1, 39; 340/825.5, 825.51, 825.57, 825.04, 825.05; 371/32, 33; 375/22

[56] References Cited

U.S. PATENT DOCUMENTS

| | | | |
|---|---|---|---|
| 4,864,559 | 9/1989 | Perlman | 370/60 |
| 4,907,222 | 3/1990 | Slavik | 307/10.1 |
| 4,914,654 | 4/1990 | Matsuda et al. | 370/85.1 |
| 4,926,417 | 5/1990 | Futami et al. | 370/85.1 |
| 4,942,571 | 7/1990 | Moller et al. | 370/85.1 |
| 4,951,281 | 8/1990 | Muto et al. | 370/94.1 |
| 5,079,759 | 1/1992 | Kajiyama | 370/85.15 |
| 5,119,371 | 6/1992 | Inoue et al. | 370/85.1 |
| 5,121,386 | 6/1992 | Wolfsgruber et al. | 370/85.1 |

FOREIGN PATENT DOCUMENTS 0217571 4/1987 European Pat. Off. .
0319271 6/1989 European Pat. Off. .

OTHER PUBLICATIONS

W. Stalling, "Data and Computer Communications" 1988, pp. 423–437.
Microprocessing & Microprogramming Feb. 19, 1987, vol. 19, No. 2, pp. 153–166, D. Del Corso et al, An Integrated Controller for Modified Inter-Integrated Circuit Protocol.

*Primary Examiner*—Wellington Chin
*Assistant Examiner*—Ajit Patel
*Attorney, Agent, or Firm*—Frishauf, Holtz, Goodman & Woodward

[57] ABSTRACT

A multiplex transmission system of this invention includes a plurality of multiplex nodes interconnected by a common multiplex transmission line. A plurality of groups of different combinations of the multiplex nodes are predetermined, and a frame of data is transmitted among the multiplex nodes through the multiplex transmission line. The data frame includes a group specifying area specifying a group of nodes from which an acknowledge signal is to be returned. When a data frame transmitted from a sending node is received, each multiplex node determines whether or not it belongs to the group specified by bits in the group specifying area of the transmitted frame. When the data frame is properly received, only those multiplex nodes which belong to the specified group return the acknowledge signals to an acknowledge signal area in the data frame in accordance with the bits in the group specifying area, whereby the transmission efficiency is improved.

15 Claims, 7 Drawing Sheets

| ACK TABLE IN EACH MULTIPLEX NODE | VALUE IN GROUP SPECIFYING AREA | ACK SIGNALS IN ACK SIGNAL AREA | | |
|---|---|---|---|---|
| 1111111111111111111111111111 | 0001 | 11111100 | NONE | NONE |
| SAME AS ABOVE | | SAME AS ABOVE | | |
| SAME AS ABOVE | | SAME AS ABOVE | | |
| SAME AS ABOVE | | SAME AS ABOVE | | |
| SUBJECT OF UPDATING → 11111100 1111111111111111111111 | 0010 | 11110001 | NONE | NONE |
| SAME AS ABOVE | | SAME AS ABOVE | | |
| SAME AS ABOVE | | SAME AS ABOVE | | |
| SAME AS ABOVE | | SAME AS ABOVE | | |
| 11111100 11110001 1111111111111111 | 1001 | 11111100 11000000 | NONE | NONE |
| SUBJECT OF UPDATING → SAME AS ABOVE | | SAME AS ABOVE | | |
| SAME AS ABOVE | | SAME AS ABOVE | | |
| SAME AS ABOVE | | SAME AS ABOVE | | |
| 11111100 11110001 11111111 1000000 | 0001 | 11111111 | NONE | NONE |
| 11111100 11110001 11111111 1000000 | 0001 | 11111111 | NONE | NONE |

FIG. 7

(a) | SOM | ID | 0 | 0 | DATA1 | DATA2 | DATA3 | ERROR CHECK CODE | EOD | (NODE) 0,1,2,3,4,5,6,7 | EOM |

GROUP SPECIFYING AREA (b) | SOM | ID | 0 | 1 | DATA | DATA2 | DATA3 | ERROR CHECK CODE | EOD | (NODE) 8,9,10,11,12,13,14,15 | EOM |

(c) | SOM | ID | 1 | 1 | DATA1 | DATA2 | DATA3 | ERROR CHECK CODE | EOD | (NODE) 0,1,2,3,4,5,6,7 ... 24,25,26,27,28,29,30,31 | EOM |

MULTIPLEX TRANSMISSION SYSTEM

BACKGROUND OF THE INVENTION

1. Field of the Invention

This invention relates to a multiplex transmission system for carrying out a data transmission among a plurality of multiplex nodes connected to a common multiplex transmission line, and more particularly, to a multiplex transmission system using CSMA/CD (carrier sense multiple access/collision detection).

2. Description of the Related Art

In conventional multiplex transmission systems of this type, a plurality of terminals (multiplex nodes) are connected to a common multiplex transmission line (multiplex bus) formed of, e.g., a paired cable. One of the multiplex nodes sends a predetermined data frame to the multiplex bus in accordance with the CSMA/CD method, to thereby transmit data simultaneously to the other multiplex nodes. The data frame includes an acknowledge signal (ACK signal) area at an end thereof.

In such systems, it is known that each of the multiplex nodes that received the data frame returns an ACK signal to a bit position of the ACK signal area preassigned thereto.

The multiplex nodes each include a computer for communication, and these computers operate independently of one another and are able to send a data frame to the multiplex bus at desired timings. Therefore, a collision of transmitted messages can occur on the multiplex bus, and conventionally this is prevented by setting a priority sequence for the transmission of individual messages.

In accordance with the priority sequence thus set, each computer carries out a priority control to send a message without destroying same. Specifically, each computer carries out a data transmission in accordance with a nondestructive arbitration type CSMA/CD access method in which the transmission of a message with a lower priority is automatically interrupted and only the higher-priority message is continuously transmitted. When the data is properly received, each multiplex node returns an ACK signal to a location of address uniquely assigned thereto (respective bit area in the ACK signal area).

If a local error occurs in the network and the data received by a multiplex node is erroneous, then no ACK signal is returned from this multiplex node, and therefore, the sending multiplex node determines that an abnormal situation occurred, and retransmits the data. The sending multiplex node repeats the transmission of the data, e.g., three times at the maximum, until all of the registered multiplex nodes return the ACK signals. In prior art systems, all nodes have the function of determining whether or not ACK signals have been returned from the nodes and retransmitting data.

A sending multiplex node uses an ACK management function, i.e., if a node fails to return the ACK signal even though the data transmission has been repeated three times, such a node is regarded as being in trouble and is excluded from the registered nodes, and when an extra ACK signal is received, the node corresponding to this ACK signal is registered.

In this multiplex transmission system, since all of the nodes connected to the network return ACK signals, the ACK signal area occupies a large portion of the data frame if the number of nodes connected to the network is increased, and thus a problem arises in that the transmission efficiency is lowered during a data frame transmission. In other words, to ensure a certain transmission efficiency, the number of nodes connectable to the network is limited.

SUMMARY OF THE INVENTION

This invention was contrived in view of the above circumstances, and an object thereof is to provide a multiplex transmission system capable of carrying out a data frame transmission without lowering the transmission efficiency.

Another object of this invention is to provide a multiplex transmission system permitting a significant increase in the number of nodes connectable to a network.

The above objects can be achieved by a multiplex transmission system of this invention which has a plurality of multiplex nodes interconnected by a common multiplex transmission line for transmitting a frame of data among the multiplex nodes through the multiplex transmission line, wherein, when a data transmission is properly carried out, an acknowledge signal indicating a proper completion of the data transmission is returned to an acknowledge signal area provided in the frame of data corresponding to the respective multiplex nodes, the frame of data including an identifier which specifies one of groups of predetermined combinations of multiplex nodes from which the acknowledge signal is to be returned, and the multiplex nodes which belong to a specified group returning the acknowledge signal in accordance with the identifier in the transmitted frame of data.

In the multiplex transmission system according to this invention, the multiplex nodes connected to the common multiplex transmission line detect the identifier in the transmitted data frame. Among these multiplex nodes, only those multiplex nodes which belong to the group specified by the identifier return the acknowledge signals, whereby the transmission efficiency is improved.

The above and other objects, features, and advantages of this invention will become more apparent from the ensuing detailed description taken in conjunction with the accompanying drawings.

DESCRIPTION OF THE PREFERRED EMBODIMENTS

Figure 1:
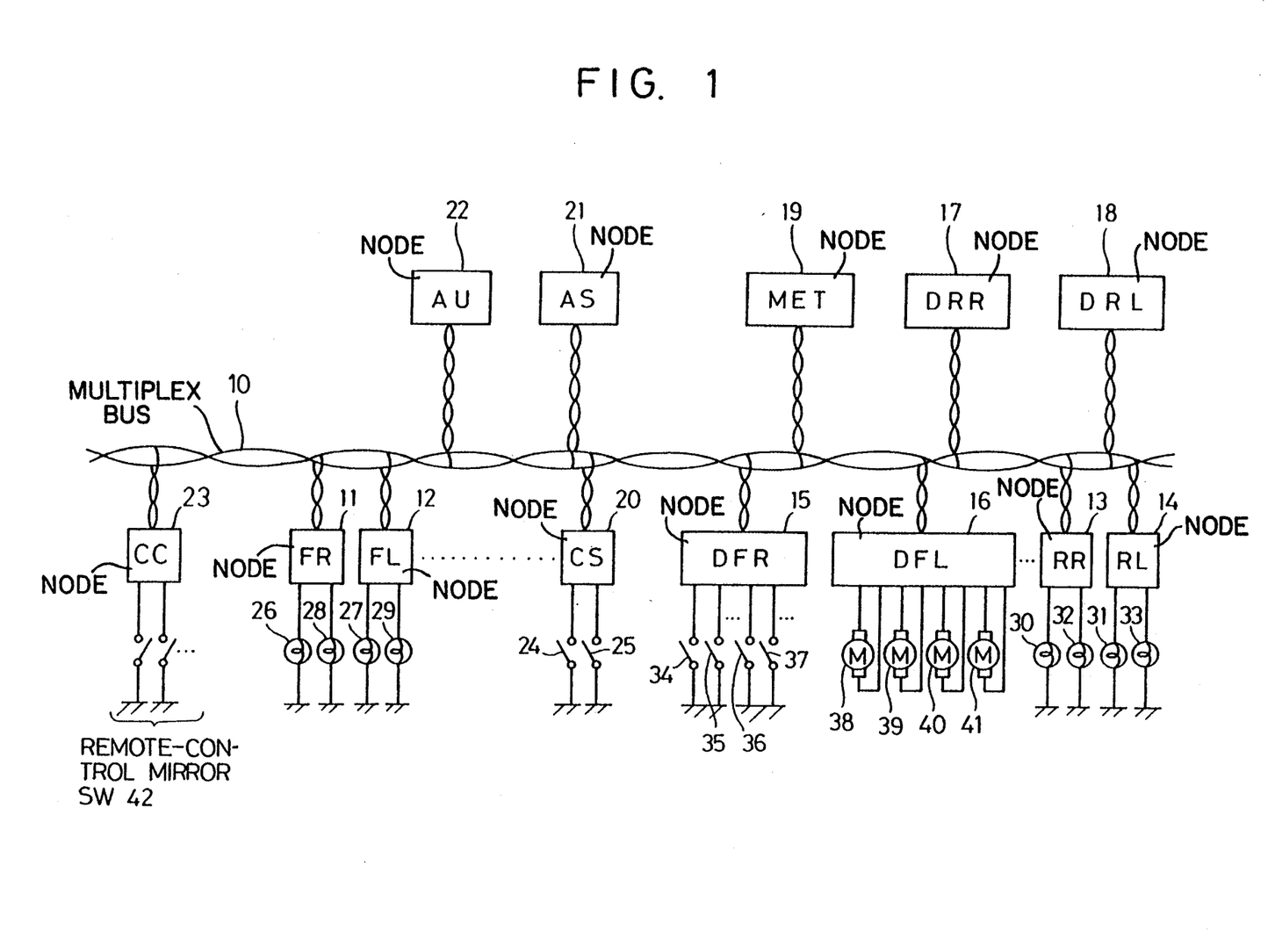
FIG. 1 is a diagram showing the arrangement of an automobile multiplex transmission system using a nondestructive arbitration type CSMA/CD method, according to this invention.

Referring to FIG. 1, a multiplex transmission system is installed in an automotive vehicle using a nondestructive arbitration type CSMA/CD access system. This multiplex transmission system comprises a plurality of multiplex nodes which include, e.g., a front-right (FR) multiplex node 11, a front-left (FL) multiplex node 12, a rear-right (RR) multiplex node 13, a rear-left (RL) multiplex node 14, a door front-right (DFR) multiplex node 15, a door front-left (DFL) multiplex node 16, a door rear-right (DRR) multiplex node 17, a door rear-left (DRL) multiplex node 18, a meter (MET) multiplex node 19, a combination switch (CS) multiplex node 20, an air conditioner switch (AS) multiplex node 21, an air conditioner unit (AU) multiplex node 22, and a center console (CC) multiplex node 23; and a multiplex bus 10 formed of, e.g., a shielded twisted pair cable. These multiplex nodes 11 through 23 are connected in a multi-drop fashion to the multiplex bus 16 to constitute a network. In this network, signals containing vehicle drive information are transmitted serially in units of data frames in a multiplex mode.

Among these multiplex nodes, the FR multiplex node 11 and the FL multiplex node 12 are supplied, respectively, with a signal from a headlight switch 24 and a signal from a turn signal switch 25, through the CS multiplex node 20. In accordance with these signals, the FR and FL multiplex nodes 11 and 12 turn on and off right and left headlights 26 and 27 and right and left turn signal lights 28 and 29 connected thereto.

Signals from the headlight switch 24 and turn signal switch 25 are also supplied to the RR and RL multiplex nodes 13 and 14, and in accordance with these signals, the multiplex nodes 13 and 14 turn on and off right and left rear tail-lamps 30 and 31 and right and left turn signal lights 32 and 33.

The DFR multiplex node 15 is supplied with signals from a door lock switch 34 and door unlock switch 35, as well as signals from power window up switches 36 and power window down switches 37 associated with individual doors. These signals are transmitted in the form of multiple signals to the DFL multiplex node 16 and the other door multiplex nodes 17 and 18. For example, when a door lock signal or door unlock signal is received from the door lock switch 34 or door unlock switch 35, the DFL multiplex node drives a door lock motor 38 or door unlock motor 39 in accordance with the received signal. When a power window up signal or power window down signal is received from the power window up switch 36 or power window down switch 37, the DFL multiplex node 16 drives a power window up motor 40 or a power window down motor 41 in accordance with the received signal.

The CC multiplex node 23 is supplied with signals from remote-control mirror switches 42, and these signals are then transmitted in the form of multiple signals to the DFR and DFL multiplex nodes 15 and 16. Upon receiving these signals, the DFR and DFL multiplex nodes 15 and 16 drive respective motors to adjust the mirror positions in accordance with the signals.

A large number of signals are transferred between the AU multiplex node 22 which controls the air conditions in the automobile and the AS multiplex node 21 which controls the switches of an air conditioner. Various indicators, not shown, are connected to the MET multiplex node 19.

In this type of automobile multiplex transmission system, multiplex nodes that are closely related can be considered to form a group. In the illustrated embodiment, for example, the FR, FL, RR, MET and CS multiplex nodes 11 to 14, 19 and 20 can be regarded as a group related to the lighting, the DFR, DFL, DRR, DRL and CC multiplex nodes 15 to 18 and 23 can be regarded as a group related to the doors, and the AS and AU multiplex nodes 21 and 22 can be regarded as a group related to the air conditioner. In the case of grouping the nodes in this manner, it can be said that, while a large number of signals are transferred within the individual groups, a relatively small number of signals are transferred between different groups. In this multiplex transmission system, some signals are, though not large in number, transmitted without regard to the grouping. For example, a signal from the ignition switch contains information required by all nodes for carrying out a power supply control.

The multiplex transmission system of this invention is particularly advantageous in the case in which nodes can be classified into groups, as mentioned above. In this embodiment, the multiplex nodes are grouped according to functions (each group including eight nodes at the most). Namely, in the embodiment, nodes 0 to 7 constitute a first group, nodes 8 to 15 constitute a second group, nodes 16 to 23 constitute a third group, and nodes 24 to 31 constitute a fourth group.

FIG. 2(a)–(d) illustrate a message format for data frames according to one embodiment of this invention. The frames shown in FIG. 2 each comprise an SOM (start-of-message) indicating the start of the message, a message ID indicating the contents of each of subsequent data (DATA) (the message ID may at the same time include a priority used for determining a priority sequence when a plurality of multiplex nodes simultaneously send data), a group specifying area, described later, data areas (DATA 1 to DATA 3) having a fixed or variable length, an error check code such as a CRC (cyclic redundancy check code), an EOD (end-of-data) indicating the end of the data, an ACK signal area to which ACK signals are returned from all of the multiplex nodes specified in the group specifying area on a bit-wise basis, and an EOM (end-of-message) indicating the end of the message.

Figure 2:
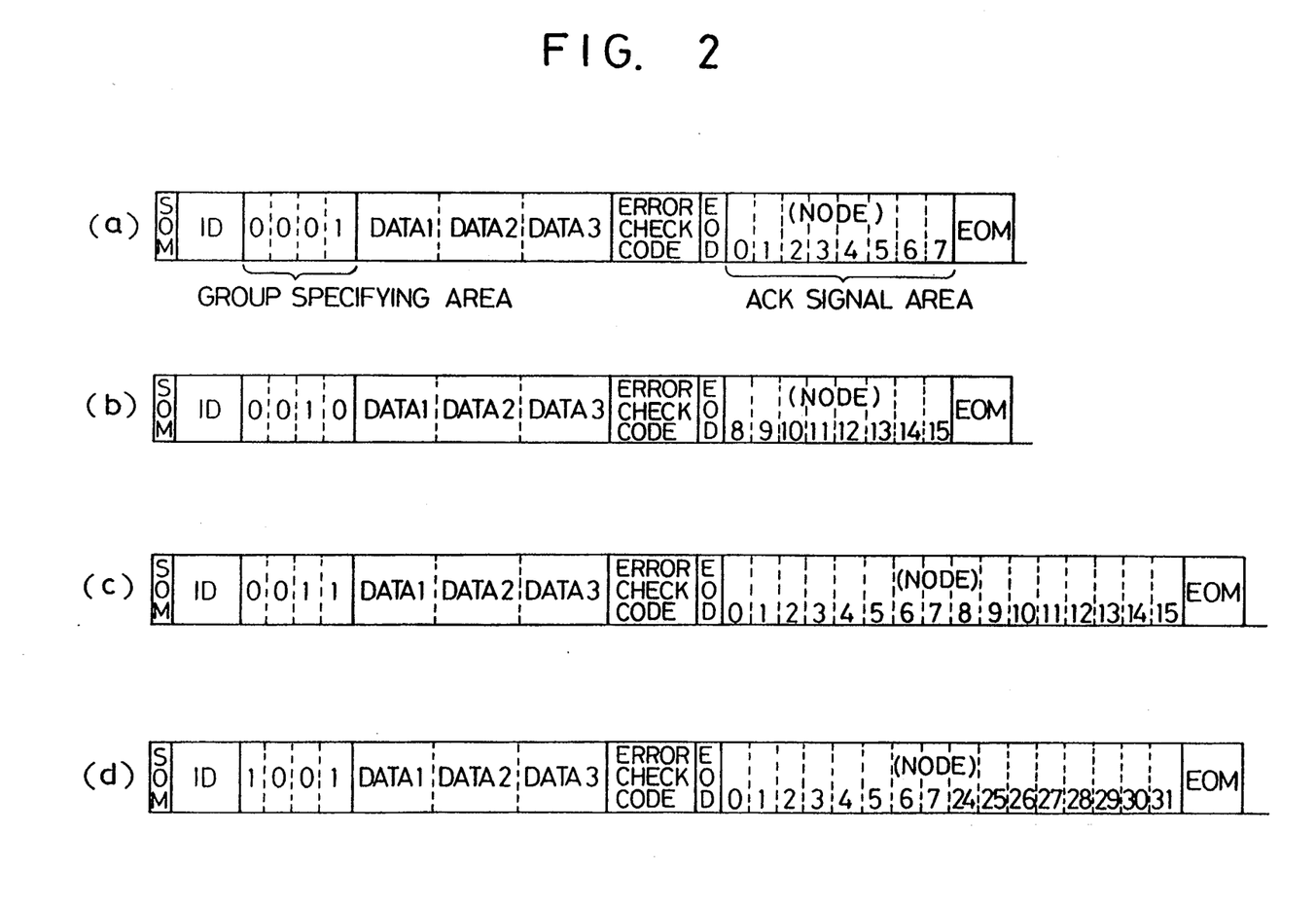
FIG. 2 is a diagram illustrating a message format for data frames according to a first embodiment of this invention.

The feature of the message format resides in that the transmitted frame includes the group specifying area specifying a group (first, second, third or fourth group) of multiplex nodes from which ACK signals are to be returned in response to the data frame. In the illustrated embodiment, the multiplex nodes belonging to the group specified by the group specifying area return ACK signals following the end-of-data in the ascending order of addresses. Namely, the first to fourth groups are specified in the group specifying area of a transmission frame from the least significant bit thereof, i.e., "0001" to "0100" respectively. When a certain group is specified in the group specifying area, the nodes belonging to the specified group successively return ACK signals following the end-of-data. In this embodiment, a plurality of groups can be simultaneously specified, as shown in FIG. 2(d). For example, when the first and fourth groups are to be simultaneously specified, "1001" is set in the group specifying area of the frame.

Figure 3:
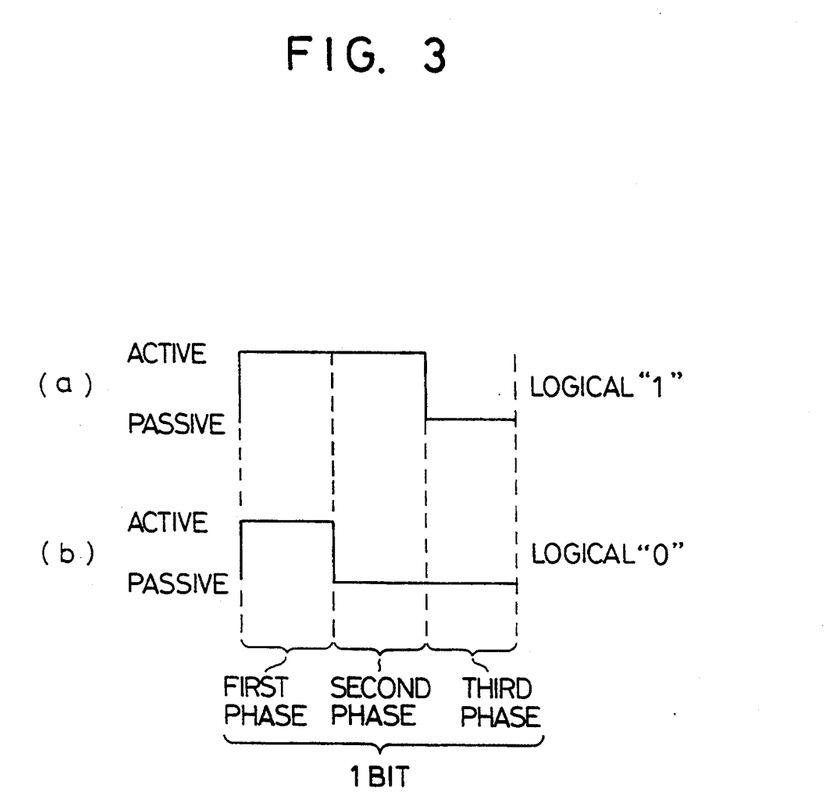
FIG. 3 is a diagram showing the structure of a PWM signal used for a transmission code in the multiplex transmission system.

The ACK signal area may be constituted by various transmission codes. An example is shown in FIG. 3, in which a PWM (pulse-width modulated) signal is used, to facilitate the return and reception of the ACK signal by each multiplex node.

In the illustrated PWM signal, one logical bit is divided into three bit segments (hereinafter referred to as "phases"). First and third phases of the PWM signal have fixed levels, i.e., they have active and passive levels, respectively, and a second phase may have an active or passive level. Namely, when the second phase of the PWM signal is active, then it means logical "1," and when the second phase is passive, it means logical "0."

When data is properly received, each of the multiplex nodes of the specified group returns an ACK signal to a location (bit area) of address uniquely assigned thereto. Accordingly, the sending multiplex node, which is the source of transmission of a data frame, sends an active signal at the first phase of each bit in the ACK signal area to the multiplex bus 10. The receiving multiplex nodes each detect the leading edge of the first phase of the bit area (in the ACK signal area of the transmitted data frame) assigned thereto, and at the same time sets the multiplex bus 10 active and maintains the active state up to the second phase, so that the bit concerned indicates logical "1." On the other hand, when the data is not properly received, each of the receiving nodes does not set the multiplex bus 10 active, though it detected the leading edge of the first phase of the bit assigned thereto, and therefore, the second phase becomes passive, which indicates logical "0."

Also in this case, a PWM signal is used for the transmission code, like the transmission code in the ACK signal area. Namely, when a data frame is transmitted between the AS and AU multiplex nodes 21 and 22, for example, the AU multiplex node 22 sends an active signal at the first phase, and the AS multiplex node 21 transmits data at least in the second phase, in a manner timed with the first phase. Accordingly, the AS and AU multiplex nodes 21 and 22 can be easily synchronized.

Figure 4:
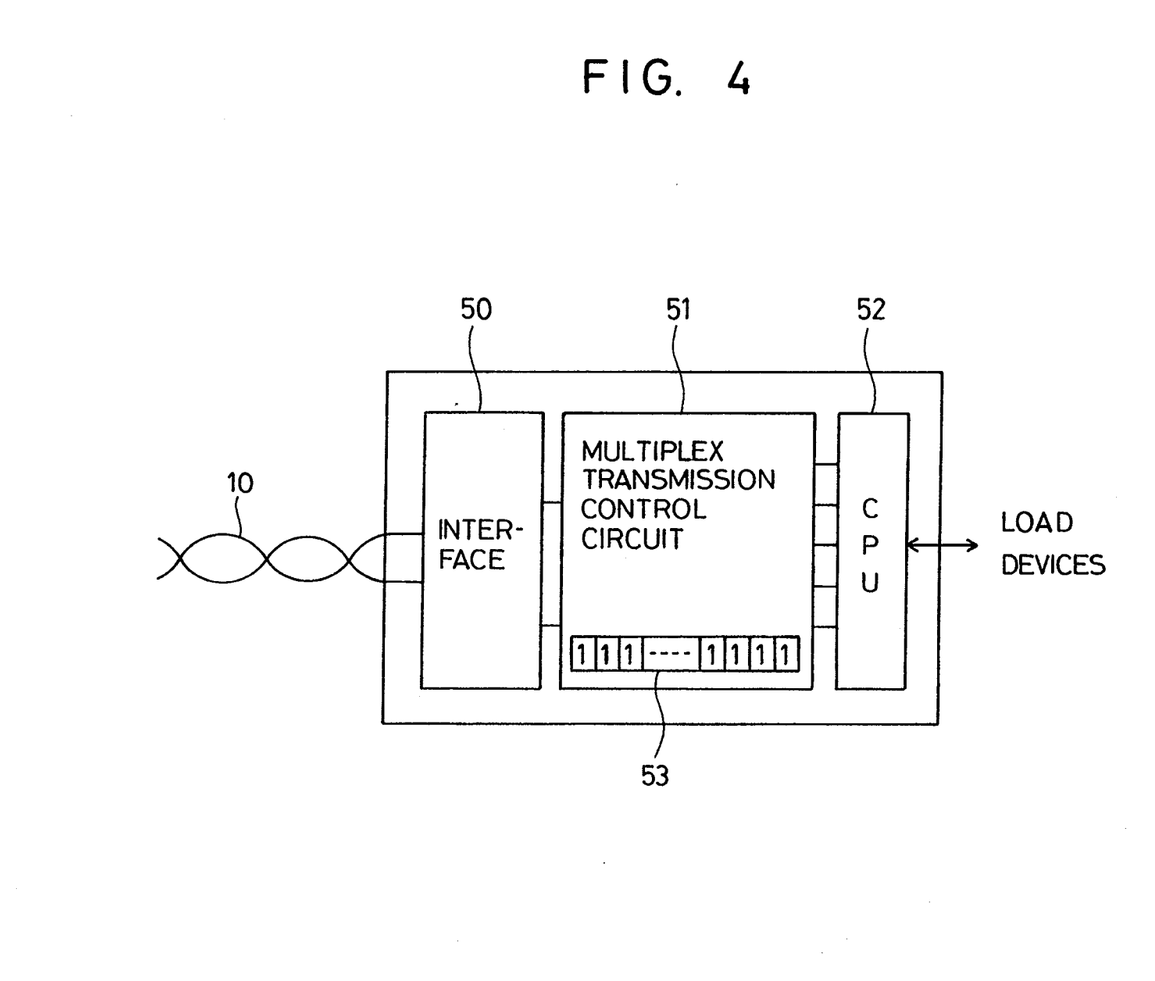
FIG. 4 is a schematic diagram showing the arrangement of a multiplex node used in this invention.

As shown in FIG. 4, each multiplex node includes an interface circuit 50, a multiplex transmission control circuit 51, and a control circuit (CPU) 52.

The interface circuit 50 interfaces between the multiplex bus 10 and the multiplex transmission control circuit 51.

The multiplex transmission control circuit 51 includes an ACK table 53 for identifying individual nodes connectable to the network by means of bits. If the total number of the nodes is 32, for example, the ACK table 53 includes bit areas corresponding to the 32 nodes. The multiplex transmission control circuit 51 has the bit areas set corresponding to the individual groups mentioned above, and in an initialized state, the bits in these bit areas all represent logical "1," i.e., a state in which all of the 32 nodes are connected to the network. The multiplex transmission control circuit 51 of a receiving node determines whether or not the node thereof belongs to the specified group, on the basis of the data in the group specifying area of the frame supplied from the multiplex bus 10 through the interface circuit 50. If the node belongs to the specified group, and if the data is properly received, the multiplex transmission control circuit 51 sends an ACK signal acknowledging the data reception, and supplies an interrupt signal to the CPU 52. The multiplex transmission control circuit 51 of a sending node determines whether or not ACK signals have been returned from the multiplex nodes of the specified group, on the basis of the data in the group specifying area in the frame. If a required ACK signal is not returned, the multiplex transmission control circuit 51 retransmits the frame.

The CPU 52 controls various load devices connected thereto, and upon receiving the interrupt signal, determines that a required data frame has been received. The CPU 52 then reads out the data of the frame from the multiplex transmission control circuit 51, stores the data in an internal memory thereof, not shown, and uses the stored data as control parameters when controlling the load devices connected to the node.

Next, the communication between the multiplex nodes of the above multiplex transmission system will be described. In this embodiment, the first group specified by the least significant bit in the group specifying area of FIG. 2(a) as "0001" is the group of nodes related to the lighting, shown in FIG. 1, and the second group specified by the second bit in the group specifying area of FIG. 2(b) as "0010" is the group of nodes related to the doors, shown in FIG. 1. The third group specified in the group specifying area of FIG. 2(c) as "0011" includes the groups of nodes related to the lighting and doors, and the fourth group specified in the group specifying area of FIG. 2(d) as "1001" includes the groups of nodes related to the lighting and air conditioner, shown in FIG. 1.

In this embodiment, the transmission of a data frame is repeated three times at the maximum, and when a required ACK signal is not returned even through the frame transmission was carried out three times, the multiplex transmission control circuit updates the ACK table. When a data transmission is properly carried out, the multiplex transmission control circuit of each node returns an ACK signal to a location of address uniquely assigned thereto.

Figure 5:
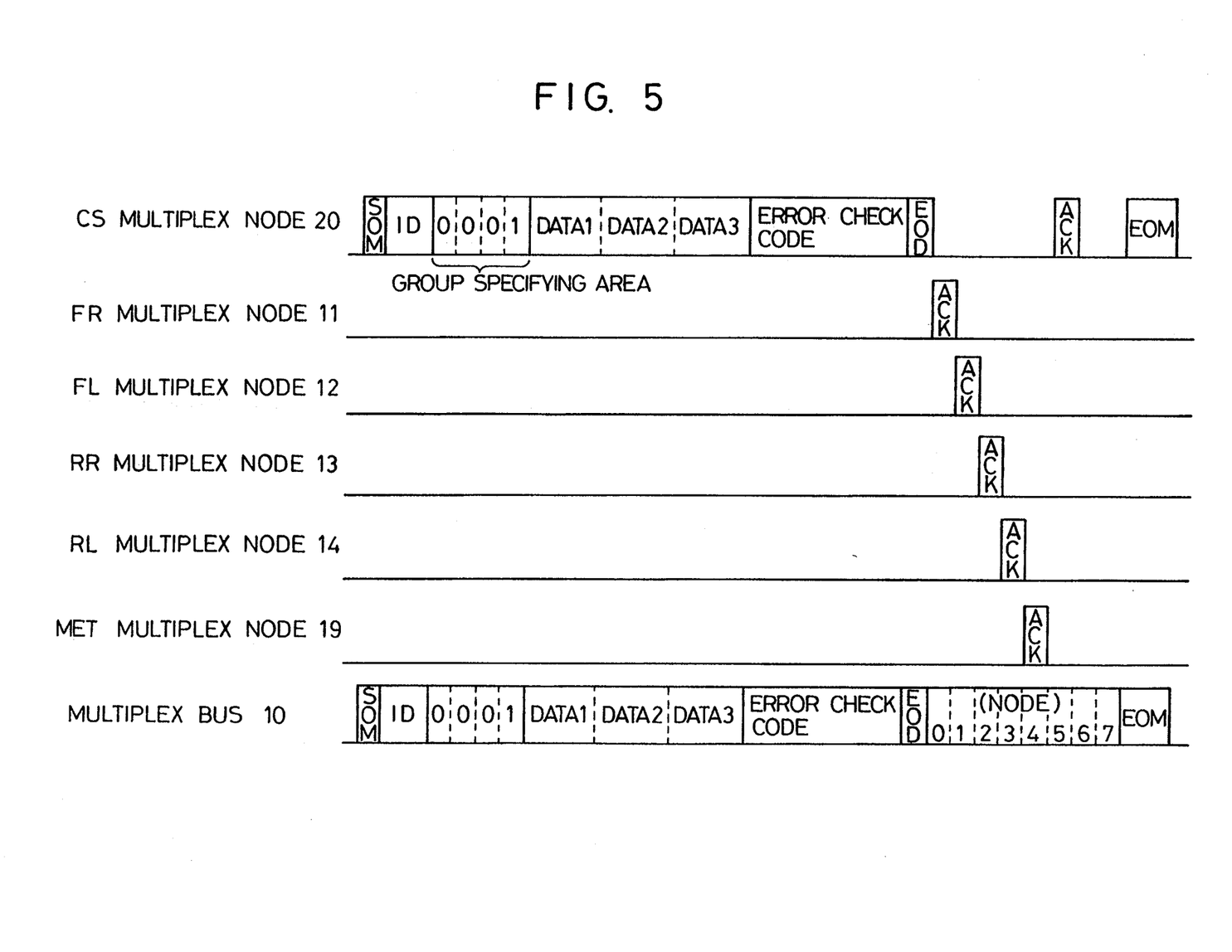
FIG. 5 is a chart showing a data frame at different stages, for illustrating a transmission procedure of the multiplex transmission system according to this invention.

Referring to FIG. 5, a sending multiplex node (in this case, the CS multiplex node 20) transmits the data frame shown in FIG. 2(a) through the multiplex bus 10. Among the various multiplex nodes, the six multiplex nodes related to the lighting, i.e., the FL, RR, RL, MET and CS multiplex nodes 11 to 14, 19 and 20, detect a request to send the ACK signal from the value "0001" in the group specifying area of the frame.

Figure 6:
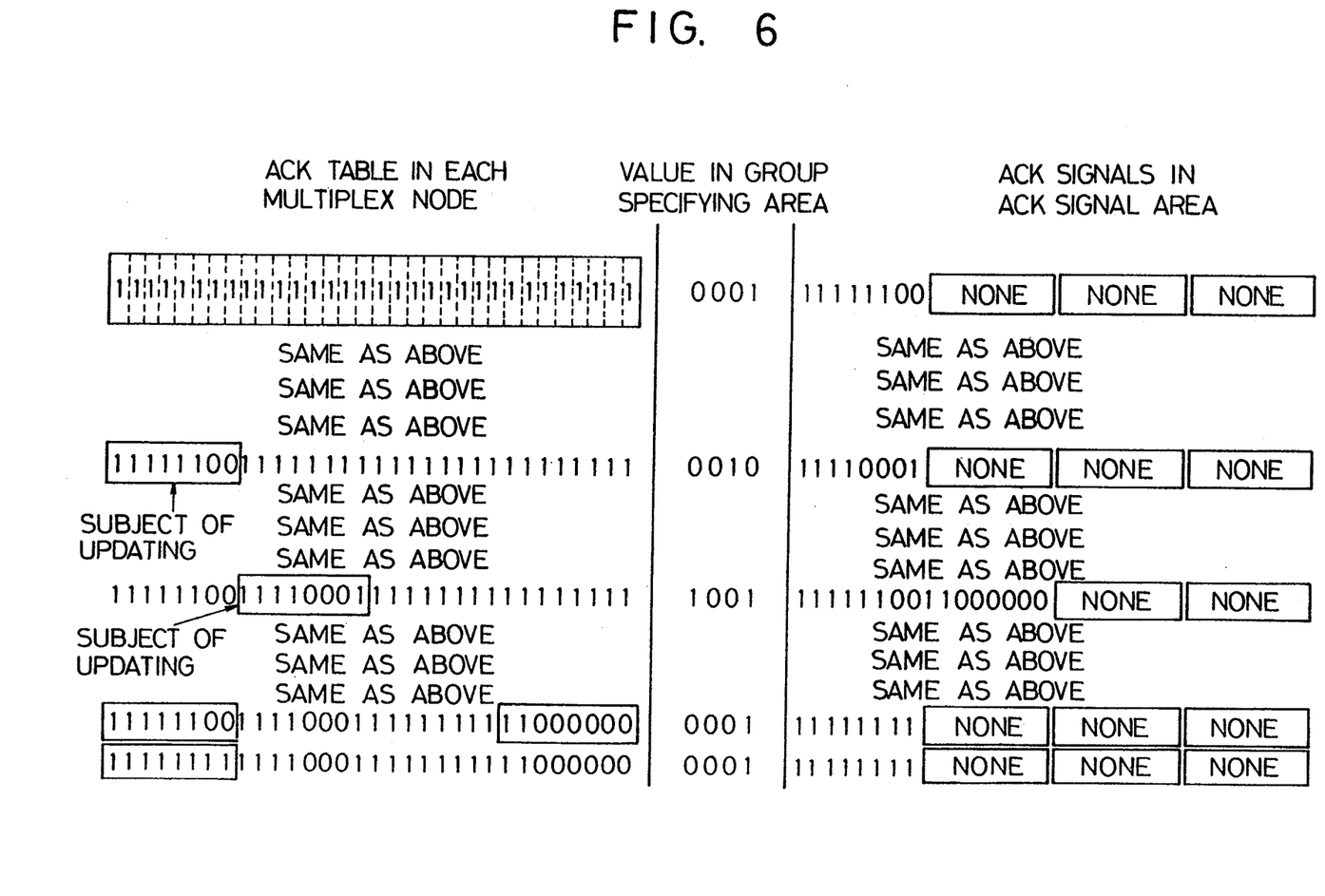
FIG. 6 is a diagram illustrating an updating of an ACK table according to this invention.

If the data is properly received, each of the multiplex nodes 11 to 14, 19 and 20 returns the ACK signal to the bit area of the address uniquely assigned thereto. In this embodiment, the multiplex nodes 11 to 14, 19 and 20 successively return the ACK signals to the bit areas assigned to the nodes 0 to 5 (see FIG. 2(a)) in the ACK signal area of the frame. Accordingly, the bit areas in the ACK signal area allotted to the nodes 0 to 5 are individually set to logical "1." Since, in this embodiment, the ACK signals from the six nodes are returned to an 8-node area in the ACK signal area, the ACK signal area becomes "11111100" as shown in FIG. 6. The multiplex nodes belonging to groups other than that related to the lighting are not specified, and therefore, do not return ACK signals.

The sending multiplex node compares the ACK signals returned to the ACK signal area with the information in the ACK table 53 thereof relating to the bit areas corresponding to the lighting group (information relating to the first to eighth bits from the left in the ACK table shown in FIG. 6).

If the returned ACK signals coincide with the information in the ACK table 53, the sending multiplex node determines that signals were properly transmitted, and thus ends the data transmission. In the illustrated example, since all bits in the ACK table 53 of the sending multiplex node are set to logical "1" by the initialization, as shown in FIG. 6, the sending nodes determines that the returned signals do not coincide with the information in the table. In this case, the sending multiplex node repeats the transmission of the frame, three times at the maximum, until the ACK signals and the information in the ACK table 53 become coincident.

ACK signals are not returned from all of the eight nodes set in the ACK table 53 even if the same frame is transmitted three times, and therefore, the sending multiplex node regards the two nodes, which did not return the ACK signals, as not being connected to the multiplex bus. In accordance with this determination, the sending multiplex node determines that the information in the ACK table 53 relating to the bit areas corresponding to the lighting group must be updated. Thus, the sending multiplex node sets the bits in the bit areas corresponding to the two nodes which did not return the ACK signals to logical "0."

The multiplex nodes other than the sending multiplex node (the multiplex nodes of all groups) also individually carries out the above-mentioned ACK management in accordance with the returned ACK signals. Namely, the individual multiplex nodes determine that the information in the bit areas of the ACK tables 53 corresponding to the lighting group must be updated, and set the bits of the bit areas corresponding to the two nodes which did not return the ACK signals to logical "0" (see FIG. 6).

Suppose, then, the frame shown in FIG. 2(b) is transmitted from a sending multiplex node (in this case, the DFR multiplex node 15) through the multiplex bus 10. Among the multiplex nodes, those belonging to the group related to the doors, i.e., the DFR, DFL, DRR, DRL and CC multiplex nodes 15 to 18 and 23, detect a request to send the ACK signal from the value "0010" in the group specifying area of the frame.

When the data is properly received, each of the multiplex nodes 15 to 18 and 23 returns an ACK signal to the bit area in the ACK signal area at the address uniquely assigned thereto. In this embodiment, the multiplex nodes 15 to 18 and 23 successively return the ACK signals to the bit areas of the ACK signal area assigned to the nodes 8 to 11 and 15 (see FIG. 2(b)). Accordingly, the bit areas in the ACK signal area corresponding to the nodes 8 to 11 and 15 are set to logical "1."In this embodiment, since the ACK signals are returned from the five nodes to an 8-node area in the ACK signal area, the bits in the ACK signal area become "11110001" as shown in FIG. 6.

The sending multiplex node compares the ACK signals returned to the ACK signal area with the information in the ACK table 53 thereof relating to the bit areas corresponding to the door group (information relating to the ninth to sixteenth bits from the left in the ACK table shown in FIG. 6).

In the illustrated case, since the bits in these bit areas of the ACK table 53 are set to logical "1" by the initialization, as shown in FIG. 6, the sending multiplex node determines that the returned signals do not coincide with the information in the table. In this case, the sending multiplex node repeats the transmission of the frame, three times at the maximum.

ACK signals are not returned from all of the eight nodes set in the ACK table 53 even if the same frame is transmitted three times, and therefore, the sending multiplex node regards the three nodes, which did not return the ACK signals, as not being connected to the multiplex bus. Then, the sending multiplex node determines that the information in the ACK table 53 relating to the bit areas corresponding to the door group must be updated, and thus sets the bits in the bit areas corresponding to the three nodes which did not return the ACK signals to logical "0."

The multiplex nodes other than the sending multiplex node (the multiplex nodes of all groups) also individually carries out the ACK management. Namely, the individual multiplex nodes set the bits of the bit areas corresponding to the three nodes which did not return the ACK signals to logical "0" (see FIG. 6).

Let it now be assumed that the frame shown in FIG. 2(d) is transmitted from a sending multiplex node through the multiplex bus 10. Among the multiplex nodes, those belonging to the groups related to the lighting and air conditioner, i.e., the FR, FL, RR, RL, MET and CS multiplex nodes 11 to 14, 19, 20 and the AS and AU multiplex nodes 21 and 22, detect a request to send the ACK signal from the value "1001" in the group specifying area of the frame.

When the data is properly received, each of the multiplex nodes 11 to 14, 19, 20, 21 and 22 returns an ACK signal to the bit area in the ACK signal area at the address uniquely assigned thereto. In this embodiment, the multiplex nodes 11 to 14, 19, 20, 21 and 22 successively return the ACK signals to the bit areas of the ACK signal area assigned to the nodes 0 to 5, 24 and 25 (see FIG. 2(d)). Accordingly, the bit areas in the ACK signal area corresponding to the nodes 0 to 5, 24 and 25 are set to logical "1." In this embodiment, since the ACK signals are returned from the eight nodes (the six nodes of the lighting group and the two nodes of the air conditioner group) to a 16-node area in the ACK signal area, the bits in the ACK signal area become "1111110011000000" as shown in FIG. 6.

The sending multiplex node compares the ACK signals returned to the ACK signal area with the information in the ACK table 53 thereof relating to the bit areas corresponding to the lighting and air conditioner groups (information in the first to eighth bits and the twenty-fifth to thirty-second bits from the left in the ACK table shown in FIG. 6).

In the illustrated example, since the first to sixth bits and the ninth and tenth bits from the left in the ACK table 53 are set to logical "1," as shown in FIG. 6, the sending multiplex node determines that the returned signals do not coincide with the information in the table. In this case, the sending multiplex node repeats the transmission of the frame, three times at the maximum.

ACK signals are not returned from all of the fourteen nodes set in the ACK table 53 even if the same frame is transmitted three times, and therefore, the sending multiplex node regards the six nodes, which did not return the ACK signals, as not being connected to the multiplex bus. Then, the sending multiplex node determines that the information in the ACK table 53 relating to the bit areas corresponding to the air conditioner group must be updated, and thus sets the bits in the bit areas corresponding to the six nodes which did not return the ACK signals to logical "0."

The multiplex nodes other than the sending multiplex node (the multiplex nodes of all groups) also individually carries out the ACK management. Namely, the individual multiplex nodes set the bits of the bit areas corresponding to the six nodes which did not return the ACK signals to logical "0" (see FIG. 6).

Suppose the data frame shown in FIG. 2(a) is transmitted from a sending multiplex node after two multiplex nodes connected to the multiplex bus 10 are newly added to the lighting group. A total of eight multiplex nodes belonging to the lighting group, i.e., the FR, FL, RR, RL, MET and CS multiplex nodes and the two multiplex nodes newly added, detect a request to send the ACK signal from the value "0001" in the group specifying area of the frame.

In this case, the multiplex nodes 11 to 14, 19 and 20 and the newly added two multiplex nodes successively return ACK signals to the bit areas (see FIG. 2(a)) in the ACK signal area assigned to the nodes 0 to 7. Accordingly, the bit areas in the ACK signal area corresponding to the nodes 0 to 7 are all set to logical "1." In this case, the ACK signals from the eight nodes are returned to the 8-node area in the ACK signal area, and therefore, the bits in the ACK signal area become "11111111" as shown in FIG. 6.

The sending multiplex node compares the ACK signals returned to the ACK signal area with the information in the ACK table 53 thereof relating to the bit areas corresponding to the lighting group.

In this case, the bits in the ACK signal area are all logical "1," and therefore, the sending multiplex node determines that two nodes were newly connected to the multiplex bus 10. Then, the sending multiplex node determines that the information in the ACK table 53 relating to the bit areas corresponding to the lighting group must be updated, and thus sets the bits in the bit areas corresponding to the two nodes which returned the ACK signals to logical "1."

The multiplex nodes other than the sending multiplex node (the multiplex nodes of all groups) also individually carries out the ACK management. Namely, the individual multiplex nodes set the bits of the bit areas corresponding to the two nodes which returned the ACK signals to logical "1" (see FIG. 6).

Figure 7:
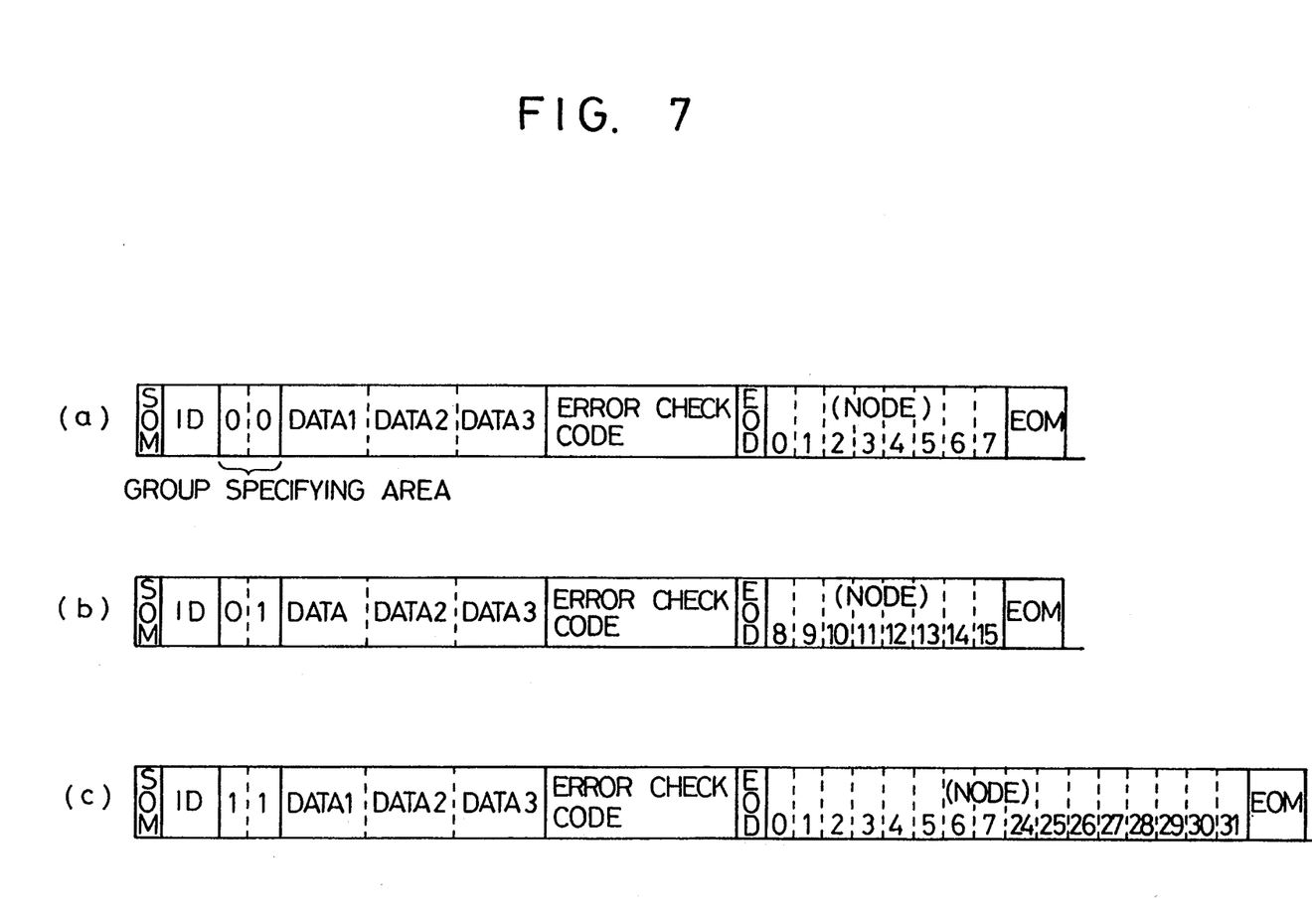
FIG. 7 is a diagram illustrating a message format for data frames according to a second embodiment of this invention.

FIG. 7(a)-(c) illustrate a message format for data frames according to a second embodiment of this invention. The data frames shown in FIG. 7 are characterized in that coding is used for specifying the groups. In this embodiment, the code "00" in the group specifying area specifies the first group, the code "01" specifies the second group, the code "10" specifies the third group, and the code "11" specifies the fourth group, for example.

Accordingly, also in the case of transmitting such data frames, ACK signals are returned from the nodes of the group specified in the group specifying area.

In the multiplex transmission system of this invention, nodes from which ACK signals are to be returned can be specified by groups, according to the contents of the data to be transmitted, and therefore, not all of the nodes are required to return the ACK signals each time a data frame is transmitted. Accordingly, the ratio of occupation of the ACK signal area to the entire frame can be reduced, and the ACK signals are efficiently returned from the required nodes only. Thus, in the multiplex transmission system of this invention, the number of nodes connectable to the network can be greatly increased, without lowering the transmission efficiency.

This invention is not limited to the above-described embodiments, and a mode may be additionally provided in which ACK signals are returned from all nodes. For example, one of the two bits in the group specifying area shown in FIG. 7 may be allotted to this mode to be used for the transmission of the ignition switch signal and the like. When this mode is set, ACK signals are returned from all of the nodes 11 to 23 connected to the multiplex bus 10.

In the second embodiment, the grouping is specified by a two-bit code. This invention, however, is not limited to such a configuration, and the individual groups may be assigned a plurality of bits, respectively. Namely, if each group is assigned 4 bits, for example, a total of sixteen combinations of node groups can be specified. Further, combinations of node numbers and group specifying codes for such combinations may be defined for each system and the definitions stored in each node, to carry out a communication.

Although the foregoing embodiments employ an acknowledge system in which a predetermined signal is sent to an ACK confirmation area when ACK signals are returned from all of the registered nodes, this invention is not limited to such a system. For example, the invention may be applied to a negative acknowledge system in which a predetermined signal is sent to the ACK confirmation area where all of the registered nodes did not return the ACK signals.

Further, although in the above embodiments, one node belongs to only one group, the nodes can individually be set in different groups. For example, the AS multiplex node 21 shown in FIG. 1 may be set in such a manner that it belongs to the air conditioner group including the AU multiplex node 22, and also belongs to the group of the FR, FL, RR, RL, MET and CS multiples nodes 11 to 14, 19 and 20. In this case, a signal equally required by the nodes of the lighting group and the AS multiplex node 21, e.g., a signal from the tail-lamp (illumination) switch, can be transmitted by specifying the multiplex nodes of the lighting group only, and an ACK signal is returned from the AS multiplex node 21 requiring the tail-lamp (illumination) switch signal, without specifying both the multiplex nodes of the lighting group and those of the air conditioner group in the data transmission. Accordingly, in the multiplex transmission system of this invention, the ACK signal area can be reduced also in such a configuration, and the transmission efficiency can be further improved.

In the above embodiments, the AS multiplex node 21 alone is able to return the ACK signal to a plurality of areas, but a plurality of nodes may have such a function.

In the above embodiments, the ACK table provided in the multiplex transmission control circuit of each node has individual bits in the memory area thereof assigned to the respective nodes of a plurality of groups, but this invention is not limited to such a structure. For example, the invention may be applied to a system wherein the multiplex transmission control circuit includes an ACK table which stores data relating to only the nodes of certain groups for the ACK management. Further, the invention may be applied to a system wherein a single ACK table is shared by all nodes belonging to a plurality of groups and stores data relating to only the nodes of the group specified by the latest transmission frame for the ACK management. These systems are advantageous in the case wherein the relation between the individual groups is not significant. In this case, the multiplex transmission circuit in each node can be made small in scale, and the manufacturing cost can be reduced.

What is claimed is:

1. A multiplex transmission system comprising:

a plurality of multiplex nodes;

a common multiplex transmission line means for interconnecting said plurality of multiplex nodes and for transmitting a frame of data among the multiplex nodes through the common multiplex transmission line;

said multiplex nodes including means for sending out an acknowledge signal, when a data transmission of a frame of data is properly carried out, for indicating a proper completion of the data transmission, and for returning said acknowledge signal to an acknowledge signal area provided in the frame of data corresponding to the respective multiplex nodes;

wherein the frame of data further includes a group identifier specifying more than one group of predetermined combinations of multiplex nodes from which an acknowledge signal is to be returned, and an acknowledge signal area having locations thereof assigned to said multiplex nodes from which the acknowledge signal is to be returned, the acknowledge signal area having a length which is variable depending on the group identifier;

the multiplex nodes, which belong to a specified group specified by the group identifier, each including means for returning an acknowledge signal in accordance with the group identifier in the transmitted frame of data; and wherein the multiplex nodes which do not belong to the specified group do not return the acknowledge signal.

2. A multiplex transmission system according to claim 1, wherein the identifier specifies on a bit-wise basis a group of multiplex nodes from which the acknowledge signal is to be returned.

3. A multiplex transmission system according to claim 1, wherein the identifier specifies by a binary code a group of multiplex nodes from which the acknowledge signal is to be returned.

4. A multiplex transmission system according to claim 1, wherein each of the multiplex nodes includes:

memory means for storing data indicating all multiplex nodes from which the acknowledge signal is to be returned in a table corresponding to the respective groups of predetermined combinations of the multiplex nodes, means for specifying a group of multiplex nodes from which the acknowledge signal is to be returned in accordance with the data stored in the table when a frame of data is transmitted, and means for returning the acknowledge signal in accordance with the data stored in the table when a frame of data is received.

5. A multiplex transmission system according to claim 1, wherein each of the multiplex nodes belong to one group, or two or more groups.

6. A multiplex transmission system according to claim 1, wherein each of the groups comprise several or all of the multiplex nodes interconnected by the multiplex transmission bus.

7. A multiplex transmission system according to claim 1, wherein said multiplex transmission system is included in an automobile control system for controlling functions in the automobile, and wherein said multiplex nodes include means for controlling respective functions in the automobile.

8. A multiplex transmission system comprising:
a plurality of multiplex nodes;

a common multiplex transmission line means for interconnecting said plurality of multiplex nodes and for transmitting a frame of data among the multiplex nodes through the multiplex common transmission line;

wherein when a data transmission of a frame of data is properly carried out, said multiplex nodes send out an acknowledge signal indicating a proper completion of the data transmission, which acknowledge signal is returned to an acknowledge signal area provided in the frame of data corresponding to the respective multiplex nodes;

the frame of data further including an identifier which specifies more than one group of predetermined combinations of multiplex nodes from which the acknowledge signal is to be returned, and an acknowledge signal area having locations thereof assigned to said multiplex nodes from which the acknowledge signal is to be returned, the acknowledge signal area having a length which is variable depending on the group identifier; and wherein the multiplex nodes which belong to a specified group return the acknowledge signal in accordance with the identifier in the transmitted frame of data; and each of said multiplex nodes including:

memory means for storing data indicating all multiplex nodes from which the acknowledge signal is returned in a table corresponding to the respective groups of predetermined combinations of the multiplex nodes, means for specifying a group of multiplex nodes from which the acknowledge signal is to be returned in accordance with the data stored in the table when a frame of data is transmitted, and means for returning the acknowledge signal in accordance with the data stored in the table when a frame of data is received.

9. A multiplex transmission system according to claim 8, wherein the identifier specifies on a bit-wise basis a group of multiplex nodes from which the acknowledge signal is to be returned.

10. A multiplex transmission system according to claim 8, wherein the identifier specifies by a binary code a group of multiplex nodes from which the acknowledge signal is to be returned.

11. A multiplex transmission system according to claim 8, wherein each of the multiplex nodes belong to one group, or two or more groups.

12. A multiplex transmission system according to claim 8, wherein each of the groups comprise several or all of the multiplex nodes interconnected by the multiplex transmission bus.

13. A multiplex transmission system according to claim 8, wherein said multiplex transmission system is included in an automobile control system for controlling functions in the automobile, and wherein said multiplex nodes include means for controlling respective functions in the automobile.

14. A multiplex transmission system comprising:

a plurality of multiplex nodes; a common multiplex transmission line means for interconnecting said plurality of multiplex nodes and for transmitting a frame of data among the multiplex nodes through the common multiplex transmission line;

said multiplex nodes including means for sending out an acknowledge signal, when a data transmission of a frame of data is properly carried out, for indicating a proper completion of the data transmission, said acknowledge signal being returned to an acknowledge signal area provided in the frame of data corresponding to the respective multiplex nodes, and wherein: the frame of data further includes an identifier specifying more than one group of predetermined combinations of multiplex nodes from which an acknowledge signal is to be returned, and an acknowledge signal area having locations thereof assigned to said multiplex nodes from which the acknowledge signal is to be returned, the acknowledge signal area having a length which is variable depending on the group identifier;

the multiplex nodes, which belong to a specified group specified by the identifier, each including means for returning an acknowledge signal in accordance with the identifier in the transmitted frame of data;

the multiplex nodes which do not belong to the specified group do not return the acknowledge signal; and wherein each of the multiplex nodes includes:

memory means for storing data indicating all multiplex nodes from which the acknowledge signal is returned in a table corresponding to the respective groups of predetermined combinations of the multiplex nodes, means for specifying a group of multiplex nodes from which the acknowledge signal is to be returned in accordance with the data stored in the table when a frame of data is transmitted, and means for returning the acknowledge signal in accordance with the data stored in the table when a frame of data is received.

15. A multiplex transmission system included in an automobile control system for controlling functions in the automobile, comprising:

a plurality of multiplex nodes, said multiplex nodes including means for controlling respective functions in the automobile;

a common multiplex transmission line means for interconnecting said plurality of multiplex nodes and for transmitting a frame of data among the multiplex nodes through a common multiplex transmission line;

said multiplex nodes including means for sending out an acknowledge signal, when a data transmission of a frame of data is properly carried out, for indicating a proper completion of the data transmission, said acknowledge signal being returned to an acknowledge signal area provided in the frame of data corresponding to the respective multiplex nodes;

wherein the frame of data further includes an identifier specifying more than one group of predetermined combinations of multiplex nodes from which an acknowledge signal is to be returned, and an acknowledge signal area having locations thereof assigned to said multiplex nodes from which the acknowledge signal is to be returned, the acknowledge signal area having a length which is variable depending on the group identifier;

the multiplex nodes, which belong to a specified group specified by the identifier, each including means for returning an acknowledge signal in accordance with the identifier in the transmitted frame of data; and wherein the multiplex nodes which do not belong to the specified group do not return the acknowledge signal.

* * * * *